US012084217B2

(12) United States Patent
Van Wijngaarden

(10) Patent No.: US 12,084,217 B2
(45) **Date of Patent: *Sep. 10, 2024**

(54) STORAGE AND DOSING STATION FOR STORAGE AND DISPENSING DOSED QUANTITIES OF SOLID DRUG PORTIONS

(71) Applicant: CareFusion Switzerland 317 Sàrl, Rolle (CH)

(72) Inventor: Arie Van Wijngaarden, Putten (NL)

(73) Assignee: CAREFUSION SWITZERLAND 317 SÀRL, Rolle (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,081

(22) Filed: Aug. 15, 2023

(65) Prior Publication Data

US 2023/0382586 A1 Nov. 30, 2023

Related U.S. Application Data

(63) Continuation of application No. 18/075,219, filed on Dec. 5, 2022, now Pat. No. 11,772,837, which is a (Continued)

(30) Foreign Application Priority Data

Aug. 31, 2012 (EP) .................................... 12182634

(51) Int. Cl.

*B65B 57/14* (2006.01)
*B65B 5/10* (2006.01)

(Continued)

(52) U.S. Cl.

CPC .............. *B65B 57/14* (2013.01); *B65B 5/103* (2013.01); *B65B 37/16* (2013.01); *B65B 57/20* (2013.01); *G07F 17/0092* (2013.01)

(58) Field of Classification Search

CPC ........ B65B 57/20; G16H 20/13; G16H 40/20; G07F 17/0092

See application file for complete search history.

(56) References Cited

U.S. PATENT DOCUMENTS

| | | |
|---|---|---|
| 3,439,001 A | 4/1969 | Pell et al. |
| 5,225,669 A | 7/1993 | Hasch |

(Continued)

FOREIGN PATENT DOCUMENTS

| | | |
|---|---|---|
| CA | 2457352 | 2/2003 |
| DE | 4324590 | 1/1995 |

(Continued)

OTHER PUBLICATIONS

International Search Report dated Oct. 25, 2013 in International Application No. PCT/EP2013/067174.

(Continued)

*Primary Examiner* — Timothy R Waggoner

(74) *Attorney, Agent, or Firm* — Morgan, Lewis & Bockius LLP

(57) ABSTRACT

A storage and dosing station for storage and dispensing dosed quantities of solid drug portions includes a controller, an information reading device coupled to the controller, a dispensing mechanism, a detachable storage container configured to store solid drug portions, an outlet configured to output the solid drug portions and an information memory. The information memory may store data that comprises one of a glossiness level of a surface of the solid drug portions and a reflectivity level of the surface of the solid drug portions that is used by the controller to control dispensing of the solid drug portions; that is used by the controller to adjust a sensor; and that comprises parameters of movement of the dispensing mechanism of one or more of maximum torque, rotation angles, and rotation positions of the move- (Continued)

ment of the dispensing mechanism used by the controller to control dispensing of the solid drug portions.

20 Claims, 10 Drawing Sheets

Related U.S. Application Data continuation of application No. 17/068,247, filed on Oct. 12, 2020, now Pat. No. 11,572,213, which is a continuation of application No. 16/160,910, filed on Oct. 15, 2018, now Pat. No. 10,800,566, which is a continuation of application No. 14/424,518, filed as application No. PCT/EP2013/067174 on Aug. 16, 2013, now Pat. No. 10,099,809.

(51) Int. Cl.
*B65B 37/16* (2006.01)
*B65B 57/20* (2006.01)
*G07F 17/00* (2006.01)

(56) References Cited

U.S. PATENT DOCUMENTS

| | | | | |
|---|---|---|---|---|
| 5,472,113 | A * | 12/1995 | Shaw | A61J 7/0084 221/15 |
| 5,752,368 | A | 5/1998 | Tobe | |
| 5,768,327 | A | 6/1998 | Pinto | |
| 5,907,493 | A | 5/1999 | Boyer | |
| 6,370,841 | B1 * | 4/2002 | Chudy | G07F 17/0092 53/445 |
| 7,742,837 | B2 | 6/2010 | Hair, III et al. | |
| 8,186,542 | B2 | 5/2012 | Kobayashi et al. | |
| 8,271,128 | B1 * | 9/2012 | Schultz | A61J 7/02 700/242 |
| 9,251,493 | B2 | 2/2016 | Jacobs | |
| 10,099,809 | B2 * | 10/2018 | Van Wijngaarden | B65B 5/103 |
| 10,800,566 | B2 | 10/2020 | Van Wijngaarden | |
| 11,572,213 | B2 | 2/2023 | Van Wijngaarden | |
| 2004/0176873 | A1 | 9/2004 | Kim | |
| 2005/0147710 | A1 | 7/2005 | Teckoe | |
| 2005/0230413 | A1 | 10/2005 | Kim | |
| 2006/0058918 | A1 * | 3/2006 | Handfield | G07F 9/026 700/236 |
| 2006/0061467 | A1 * | 3/2006 | Kim | B65B 5/103 340/539.11 |
| 2006/0124656 | A1 | 6/2006 | Popovich, Jr. | |
| 2006/0225383 | A1 | 10/2006 | Cobb | |
| 2007/0118247 | A1 | 5/2007 | Wooldridge | |
| 2007/0150092 | A1 | 6/2007 | Ohmura | |
| 2007/0189597 | A1 | 8/2007 | Limer | |
| 2008/0148512 | A1 | 6/2008 | Beskow | |
| 2008/0164281 | A1 | 7/2008 | Yuyama | |
| 2008/0190953 | A1 | 8/2008 | Mallett et al. | |
| 2009/0050644 | A1 * | 2/2009 | Yuyama | G07F 17/0092 221/277 |
| 2009/0065525 | A1 | 3/2009 | Shen | |
| 2010/0078445 | A1 | 4/2010 | Nam | |
| 2011/0042404 | A1 | 2/2011 | Koike | |
| 2012/0029692 | A1 * | 2/2012 | Owen | G07F 11/44 356/402 |
| 2013/0340390 | A1 | 12/2013 | Carson | |
| 2014/0214000 | A1 | 7/2014 | Moia | |
| 2014/0339248 | A1 | 11/2014 | Reddy | |
| 2015/0090733 | A1 | 4/2015 | Park | |
| 2016/0343151 | A1 | 11/2016 | Koike | |

FOREIGN PATENT DOCUMENTS

| | | | |
|---|---|---|---|
| EP | 0485857 | | 5/1992 |
| EP | 1241617 | A2 | 9/2002 |
| EP | 1473228 | A1 | 11/2004 |
| EP | 1604631 | A1 | 12/2005 |
| EP | 1634560 | | 3/2006 |
| EP | 1700592 | A1 | 9/2006 |
| EP | 1704844 | A1 | 9/2006 |
| JP | 2001204795 | | 7/2001 |
| JP | 2002263167 | A | 9/2002 |
| JP | 2002282339 | A | 10/2002 |
| KR | 10-2006-0023029 | | 3/2006 |

OTHER PUBLICATIONS

Written Opinion dated Oct. 25, 2013 in International Application No. PCT/EP2013/067174.

European Office Action for Application No. 12182634.1, dated Feb. 18, 2015, 3 pages.

Chinese Office Action for Application No. 2013580045467.1, dated Jul. 21, 2016, 15 pages.

Korean Office Action for Application No. 10-2015-7004320, dated Dec. 10, 2019, 7 pages including translation.

Australian Office Action for Application No. 2013307506, dated Aug. 11, 2016, 3 pages.

Brazilian Office Action for Application No. BR112015004104-3, dated Sep. 2, 2019, 6 pages including machine translation.

Canadian Office Action for Application No. 2,882,770, dated Jan. 28, 2019, 3 pages.

Extended European Search Report for Application No. 12182634.1, dated Dec. 5, 2012, 6 pages.

Indian Office Action for Application No. 566/MUMNP/2015, dated Jul. 5, 2019, 5 pages.

Japanese Office Action for Application No. 2015-528953, dated Mar. 28, 2017, 8 pages including translation.

Mexican Office Action for Application No. MX/a/2015/002504, dated Sep. 4, 2017, 6 pages including machine translation.

* cited by examiner

STORAGE AND DOSING STATION FOR STORAGE AND DISPENSING DOSED QUANTITIES OF SOLID DRUG PORTIONS

CROSS-REFERENCE TO RELATED APPLICATION

This application is a continuation of U.S. application Ser. No. 18/075,219, filed on Dec. 5, 2022, entitled "STORAGE AND DOSING STATION FOR STORAGE AND DISPENSING DOSED QUANTITIES OF SOLID DRUG PORTIONS," issued as U.S. Pat. No. 11,772,837, on Oct. 3, 2023, which is a continuation of U.S. application Ser. No. 17/068,247, filed on Oct. 12, 2020, entitled "STORAGE AND DOSING STATION FOR STORAGE AND DISPENSING DOSED QUANTITIES OF SOLID DRUG PORTIONS," issued as U.S. Pat. No. 11,572,213, on Feb. 7, 2023, which is a continuation of U.S. application Ser. No. 16/160,910, filed on Oct. 15, 2018, entitled "STORAGE AND DOSING STATION FOR STORAGE AND DISPENSING DOSED QUANTITIES OF SOLID DRUG PORTIONS," issued as U.S. Pat. No. 10,800,566, on Oct. 13, 2020, which is a continuation of U.S. application Ser. No. 14/424,518, filed on Feb. 27, 2015, entitled "STORAGE AND DOSING STATION FOR STORAGE AND DISPENSING DOSED QUANTITIES OF SOLID DRUG PORTIONS," issued as U.S. Pat. No. 10,099,809, on Oct. 16, 2018, which is the U.S. National Phase under 35 U.S.C. § 371 of International Application No. PCT/EP2013/067174, filed on Aug. 16, 2013, which claims the benefit of EP12182634.1, filed on Aug. 31, 2012. The entire contents of these applications are incorporated by reference herein.

BACKGROUND

The invention relates to a system for packaging dosed quantities of solid medicines. The invention particularly relates to a tablet packing system and a method for continuously and automatically packing prescribed tablets in separate pouches.

It is usually advantageous to package dosed quantities of solid medicines, such as tablets and pills, in bags or other types of packaging, wherein the medicines in each bag are packed separately per ingestion, wherein the bag is provided with user information, such as the day and time of day the medicines must be taken. The bags for a user are generally attached to each other and supplied rolled up in a dispenser box. The filling of individual packages with dosed quantities of solid medicines (batches) is increasingly being automated.

A known system for dosing solid medicines for final packaging in individual packages comprises a plurality of storage containers respectively provided with different types of medicine. After reading or entering a medicine prescription the storage containers relevant to the prescription are opened in order to allow a dosed quantity of medicines to drop into a central fall chute positioned under the storage containers. At the bottom of the fall duct the selectively released medicines are received in a packaging, such as a bag, after which the packaging is closed.

For the packing of the medicine, tablet feeders or dosing stations are used which contain the medicine and can be controlled to dispense a certain number of medicine entities. Conventionally, there is a tablet feeder composed of a case support table on which a motor is placed, and a tablet storage case which can be mounted on or detached from the case support table. In this kind of the dosing station, when the motor is driven, a rotor disposed inside the tablet storage case is rotated via a plurality of gears so that tablets contained in its pocket can be discharged through a delivery passage. In such dosing stations, the tablets discharged from the tablet storage case are counted by a counting sensor provided on the delivery passage.

Document EP1473228A1 discloses a tablet feeder. Tablets are delivered from a tablet storage case mounted on a case support table, and when the tablets are passed through a delivery passage formed in the case support table, quantity of the passed tablets is counted by a counting means.

EP1241617A2 discloses a medicine feeder apparatus for hospital or pharmacy, comprising cassettes holdings the tablets and having an identification like a barcode, showing information of the medicine in the cassette and a reader which reads identification of a cassette.

EP1604631A1 describes an automatic packaging machine for sealed packing of tablets. The device has a readout circuit on the machine main body that reads out the tablet information from an identification unit on a container while installed on the wall of the machine main body.

Another packaging machine is known from EP1700592A1. The machine is adapted for automatically recognizing cassettes of the cartridges of the tablet automatic packaging machine. A plurality of cartridges is arranged in multiple layers. Each cartridge is coupled to a tablet cassette having a cassette memory in which tablet information or cassette information is recorded. The cartridge comprises an inner memory to store cartridge information, a first data transmitting unit to transmit and receive commands related to preparation therefrom.

U.S. Pat. No. 8,186,542B2 describes a discharge station for medicines comprising a discharge drum which discharges the medicines from a tablet case, a medicine detecting sensor which detects the medicines discharged from the tablet case, and a control device. This control device controls a rotating motor for rotating the discharge drum to discharge the medicines from the tablet case, counts the discharged medicines based on a detecting operation of the medicine detecting sensor, and changes the discharge speed of the medicine by the discharge drum depending on the type of medicine in the tablet case. The disclosure of the mentioned patent is incorporated by reference.

A storage and dosing station for automatic packaging machines is further disclosed in EP1704844A1. The storage and dosing station comprises a stationary part to be mounted to a frame of an apparatus for packaging solid drug portions. To the stationary part, a detachable part is detachably coupled. The detachable part comprises a storage container for receiving a plurality of solid drug portions.

However, known medicine discharge stations have drawbacks when it comes to handling refilling of the containers or the reliable detection of actual ejection of a medicine portion.

An object of the invention therefore is to provide a medicine supply apparatus capable of reducing the time required for discharging medicines without causing any trouble during counting of the medicines and which at the same time enhances reliability.

The storage and dosing station according to the invention comprises a stationary part to be mounted to a frame of an apparatus for packaging solid drug portions. The stationary part comprises a first part (components) of a dispensing device, the first part of the dispensing device comprising a controller and a drive for driving an individualizing mechanism for dispensing separate solid drug portions.

To this end, the expression "first part" is meant to describe that the dispensing device may have multiple components or modules which interact to dispense separate drug portions of predetermined number or size, a first group or first part of which components or modules is comprised in the stationary part.

To the stationary part, a detachable part is detachably coupled. The detachable part comprises a storage container for receiving a plurality of solid drug portions, a second part of the dispensing device, and an information memory means (e.g. a memory module).

Again, the expression "part of the dispensing device" means that a subgroup of those means forming the dispensing device is comprised in the detachable part (another subgroup of the means forming the dispensing device being comprised in the stationary part). The detachable part and the stationary part have corresponding releasable connection means for securely mounting the container to the stationary part.

The second part of the dispensing device comprises an outlet of the storage container for outputting solid drug portions. This outlet may be a closable and openable opening or a chute or may include a separating member, e.g. a separating wheel.

The stationary part further comprises an information reading means coupled to the controller, wherein the information reading means can read information stored in the information memory means on the detachable part, if the detachable part is coupled to the stationary part.

According to the invention, a storage and dosing station for storage and dispensing dosed quantities of solid drug portions is disclosed, in which the information memory means store data that are used by the controller to control the operation of components of the dispensing device.

According to the invention, a non-volatile memory is attached to the detachable part, e.g. to the storage container. A corresponding reading means is mounted to the stationary part so that when the detachable part with the container is attached to the stationary part the reading means can read the content of the non-volatile memory. To this end, the stationary part and the memory on the detachable part may be equipped with contacts which engage with corresponding contacts on the side of the stationary part. Further, it is possible to use wireless readout, such as RFID or NFC techniques, or other transponder technique.

The reading means on the stationary part are coupled to the control of the stationary part.

According to the invention, when the detachable part is decoupled from the stationary part and filled with a certain type of medicine, information on the medicine is stored in the memory attached to the container. This is done using a writing device, e.g. a docking station which has suitable writing means which can be coupled to the memory of the container. According to the invention, the type of the medicine filled in the container and respective control information is stored in the memory. Further, the number of medicine portions (e.g. tablets) filled in the container may be stored. Additionally, information on the shape (geometry) and further features, such as the optical characteristics of the medicine, are stored.

To this end, the docking station or the writing means may be coupled to a database storing all this information in relation to the medicine type. A barcode scanner may be coupled to the docking station so that a barcode on the package containing the medicine to be filled in the container may be scanned and the corresponding information from the database is stored in the memory of the container. Since the information on the medicine loaded in the container is bound to the container itself in the memory, overall security is increased. Even if a container is detached from a stationary part and attached to another stationary part, the new stationary part instantly receives the required information on the medicine loaded. To this end, the stationary part reads the memory of each container newly coupled to the stationary part.

On the other hand, even when the container is decoupled from the stationary part, the information on the medicine contained is readily available. If a partly filled container is coupled to a reader or docking station, the information on the medicine contained makes it easy to refill the container with the same type of medicine.

According to the invention, it is therefore crucial that information on the medicine is stored in a non-volatile memory attached to the detachable part itself and not only in the whole assembly consisting of stationary part and detachable part. The stationary part only has valid information on the dispensed medicine if the container with readable information is coupled to the stationary part. The invention therefore relies on a setup in which a container is detachable from a stationary part for refilling or cleaning.

According to the invention, the information on the medicine as stored in the information memory means is not only used to identify which medicine is stored in the detachable part. The stationary part also uses this information for ensuring correct functioning of the dispensing process itself. The controller reads the stored information and based thereon the whole dispensing process is controlled. Further, the dispensing process may be monitored on basis of the information which allows for fault detection.

The controlling of the dispensing device requires different control signals, parameter sets or control instructions, based on the kind of medicine contained in the detachable part or container. According to the state of the art it was necessary to carefully adapt the dispensing device to the medicine or drugs filled in the removable part. For instance, each stationary part was adapted to be connected to particular detachable parts. It had to be made sure that the drive and its control was adapted to cause the medicine portion to be passed through the outlet of the detachable part. As an alternative, the detachable part had to be adapted to be functioning in combination with a given stationary part—e.g. by providing gears between the drive and the individualizing means.

According to the invention, the stationary part of the dosing station reads the information on the medicine contained and adapts the control of the controllable means of the stationary part and/or the detachable part accordingly. In other words, the stored information have impact on the way the dosing station works—since the dosing station hat information on the correct way to control the discharge of the stored medicine, the discharge process is more secure and better controllable.

According to the invention, the dosing station has a discharge mechanism which is disposed underneath the storage container, so that the medicine stored in the container can fall or slide downwards and can be discharged. A partitioning member as part of the individualizing mechanism separated the drugs portions and guides or forces them through the outlet of the detachable part. From there, the portions are discharged through the stationary part of the dosing station.

According to an aspect of the invention, in the storage and dosing station the information memory means store data determining the movement of the drive for driving the individualizing mechanism. The dosing station comprises a drive, e.g. an electric motor, in particular a servo motor or stepper motor, for displacing or driving the individualizing mechanism. A stepper motor is particularly suitable for the present invention because the number of rotations made thereby, and therefore also the displacement of the individualizing mechanism, can be regulated very precisely. On basis of the information stored in the memory means, the drive can be controlled. Particularly the information can include parameters for the speed control, e.g. by indication a particular number of steps to be made per time or by giving a voltage or power to apply. Further, stored information may be used to precisely precharge the individualizing mechanism. This means, that after discharge of a medicine portion, the individualizing mechanism is on basis of the stored information driven to a position in which almost the next discharge occurs. Since the precise information on the stored medicine is used to control the drive, the discharge process can take place very fast the next time a drug portion is requested. This approach is only possible since the control of the drive is based on the information stored in the memory. Otherwise, if no information on the drive parameters individually adapted to the stored drugs were available, the drive would have to wait for the next discharge in a position compatible for any kind of drugs which may be stored. To this end, the invention allows for speeding up the discharge process.

When, as described above, use is made of an electrical drive, a measuring element (sensor) can be applied to measure the resistance produced and/or the current consumed by the electric motor, whereby it is possible to detect whether a tablet has become jammed between the detachable part and the stationary part. The station control can be particularly adapted here to reverse the electric motor if the resistance detected by the measuring element exceeds a predefined value. In the case that a tablet is jammed between the storage container and the stationary part, the direction of displacement of the stationary part can thus be reversed, whereby the jam can be resolved.

Thus, in a preferred embodiment the drive for driving the individualizing mechanism comprises an electric motor and a measuring element for measuring a resistance of the electric motor, the controller being adapted to reverse the electric motor, if the resistance detected by the measuring element exceeds a predefined value.

In a preferred embodiment, in the storage and dosing station as the individualizing mechanism comprises a rotating individualizing wheel mounted in the stationary part so that it is positioned adjacent to the outlet of the storage container, if the detachable part is coupled to the stationary part. The stationary part or the detachable part have an individualizing means with receiving spaces, wherein the one or more receiving spaces are arranged in the means, wherein each receiving space is generally adapted to temporarily hold one tablet or pill. By means of axial rotation of the individualizing means, the individualizing means can be displaced between a loading state, in which a receiving space of the stationary part is aligned with a outlet or delivery opening of the storage container, and an unloading state in which the stationary part covers the delivery opening and is adapted to deliver the separated tablet to a container.

In an alternative embodiment the individualizing mechanism comprises a rotating individualizing wheel mounted in the detachable part so that it is connected to the drive, if the detachable part is coupled to the stationary part. In a particularly preferred embodiment the individualizing wheel is detachably mounted in the detachable part and contains a wheel identifier and the information memory means comprise a reader for reading and storing the wheel identifier to be read by the reading means.

In this setup, the separating wheel is replaceable or exchangeable without requiring any extensive modification on the stationary part. The reader gets the information on the wheel mounted in the detachable part an can adapt the controlling to the wheel information. This way, other kinds of drugs may be used with the storage container and by mounting another wheel and the control method is automatically adapted since the information on the wheel used are readably from the memory.

It is particularly advantageous if the information memory means store data characterizing parameters of the movement of the individualizing wheel for dispensing separate solid drug portions. Preferably, the information memory means store data characterizing rotational speed, acceleration and deceleration, maximum torque, rotation angles and/or rotation positions of the movement of the individualizing wheel for dispensing separate solid drug portions.

According to another preferred embodiment, the stationary part comprises a sensor coupled to the controller for monitoring the dispensing of a solid drug portion from said dispensing station, wherein the information memory means store data used by the controller for controlling the operation of the sensor.

According to the above explanation the stationary part in combination with the detachable part of the storage and dosing station is adapted to separate one or more single tablets from the tablets present in the storage container. Dosing can take place by selectively removing the separated tablets, generally by allowing them to fall, from the storage container through the outlet into the stationary part and from there to an respective container of an apparatus for packaging.

The medicines discharged from the container e.g. via a chute in the stationary part are detected by a sensor mounted in the stationary part and counted based on an output of this sensor. To this end, the stationary part comprises at least one sensor for detecting the moment at which a medicine in tablet form dispensed by the dosing station falls. Not only can the correct operation of the storage container, and in particular a stationary part received therein, be determined on the basis of detection of this moment of falling, it is also possible to monitor whether a storage container is no longer delivering medicines in tablet form and is therefore normally empty.

When the detachable part with the storage container is mounted on the dispenser or stationary part, the information on the medicine contained in the container is read out and the control of the stationary part adjusts the sensor control to that information. To this end, the optical sensor for dispensation (ejection) count may be calibrated according to the information stored.

In a preferred embodiment, the sensor is an optical sensor and the information memory means store data characterizing optical characteristics of the solid drug portions contained in the storage container, wherein the controller controls the optical sensor as a function of the optical characteristics.

The optical characteristics may be stored in the form of control parameters or in the form of parameters, the control may calculate parameters from.

Particularly, the optical characteristics include information on the color, glossiness and/or reflectivity of the surface of the solid drug portions.

A medicine with a shiny or glossy surface thus requires different calibration to a medicine with a matte surface.

Furthermore, liquid-filled capsules which are semi-transparent may require different calibration in order to reliably detect the ejection of a single dose. If the tablets, according to the stored information, have a shiny or glossy surface, the detection is adapted to compensate for reflection or to suppress false recognition due to multiple reflections.

It is further preferred, that said optical sensor is controlled for ambient light compensation or background light compensation.

In a preferred embodiment, the information memory means do further store information on the number, type, expiration date and/or batch number of the solid drug portions in the storage container.

According to another aspect of the invention a method for filling a storage container of a storage and dosing station according to any of the above mentioned embodiments is disclosed. The detachable part of the storage and dosing station having the storage container to be filled are attached to a docking station, the docking station comprising a reading and writing means for reading and writing the information memory means of the detachable part.

A load of solid drug portions are filled into the storage container and data is written into the information memory means, the data characterizing the type of solid drug portions filled into the storage container and including the data that are used to control the operation of components of the dispensing device.

According to a further aspect of the invention, data indicating the weight of a single solid drug portion is provided to the docking station, the weight of the attached detachable part of the storage and dosing station is monitored by a weighing means of the docking station, wherein the number of solid drug portions filled into the storage container is calculated on the basis of measured weight differences of the attached detachable part.

According to another aspect of the invention, a docking station for use in a filling method is disclosed. The docking station has receiving means for receiving the detachable part of a storage and dosing station having the storage container to be filled, and a reading and writing means coupled to the information memory means, if the detachable part of the storage and dosing station is attached to the receiving means.

In a system using the medicine supply apparatus according to the invention, a plurality of dosing stations for dispensing a dosed quantity of solid medicines is used. Containers are arranged in a movable manner in order to pass by the dosing station so that medicine from the dosing stations can be dispensed or dosed into the containers. The dosed quantity of medicines drops into an underlying collecting container. Each collecting container is adapted to collect one prescription generally associated with one user. A prescription consists here of a predefined quantity and type of solid medicine formed by tablets or pills. A supply of different types of solid medicine is held at different dosing stations.

The dosing stations generally take a substantially stationary form. It is advantageous here for a plurality of dosing stations to be positioned adjacent to each other, this enabling simultaneous filling of a plurality of collecting containers. It is also advantageous for a plurality of dosing stations to be positioned above each other, whereby multiple types of medicine can be dispensed simultaneously to the same collecting container, this also enhancing the capacity of the system. It is particularly advantageous here for at least a number of the dosing stations to be arranged in a matrix structure with dosing stations arranged in multiple horizontal rows and multiple vertical columns. It is advantageous here for the dosing stations to be positioned as closely as possible to each other, and preferably to connect to each other, which in addition to saving volume also results in time gains during filling of the collecting containers, and thereby a further increase in the capacity of the system according to the invention. It is further possible to envisage applying a plurality of matrix structures of dosing stations in order to further increase capacity.

In a particular embodiment the system comprises two matrix structures, wherein each matrix structure comprises a plurality of dosing stations arranged in rows and columns, and wherein dispensing sides of the dosing stations of the different matrix structures face toward each other.

BRIEF DESCRIPTION OF THE DRAWINGS

The invention will be discussed on the basis of non-limitative exemplary embodiments shown in the following figures. Herein.

DETAILED DESCRIPTION

Figure 1:
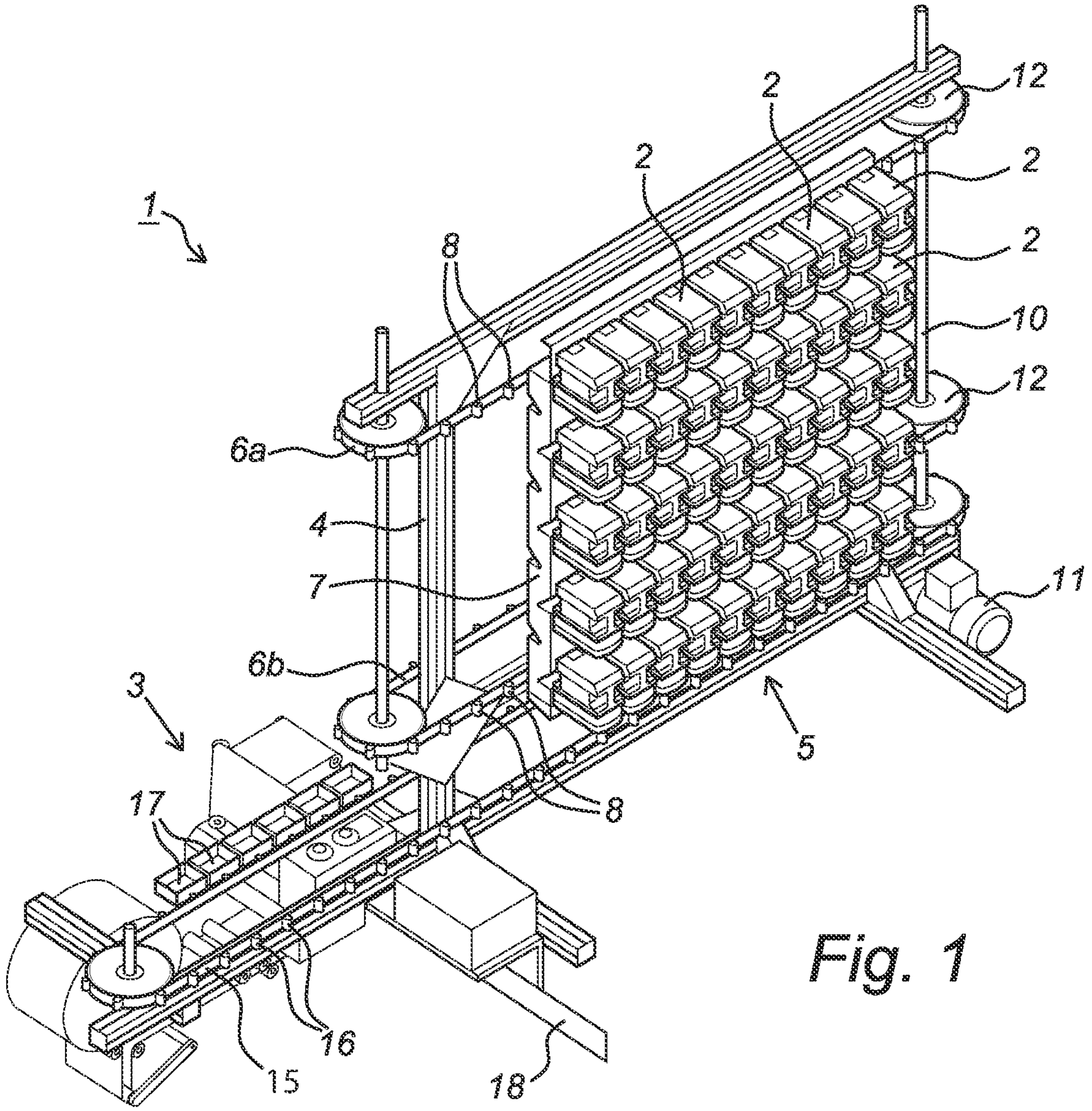
FIG. 1 is a first perspective view of a system using the invention for transporting dosed quantities of solid medicines from a plurality of dosing stations to a packaging station.
Figure 2:
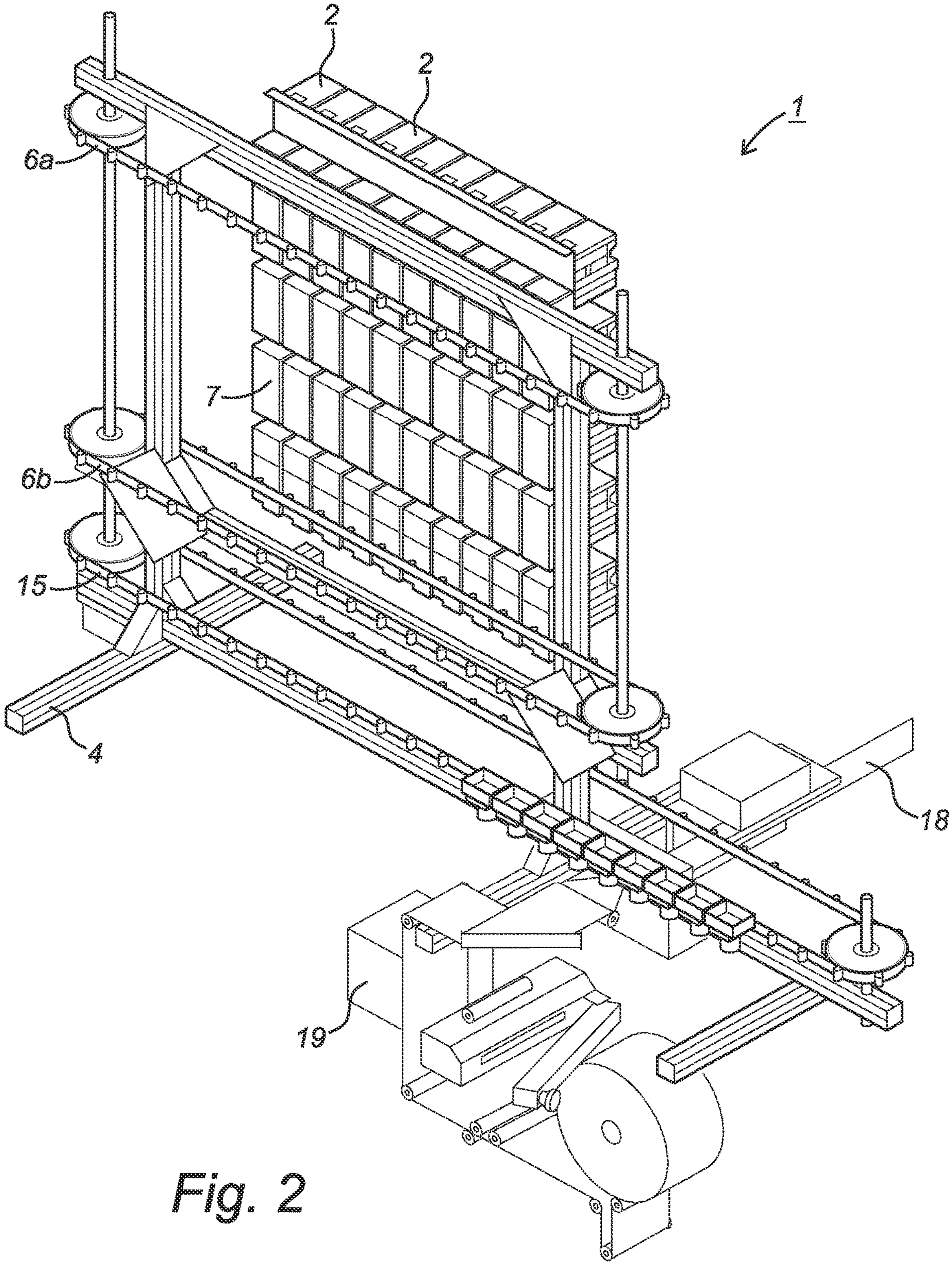
FIG. 2 is a second perspective view of the system according to FIG. 1.
Figure 3:
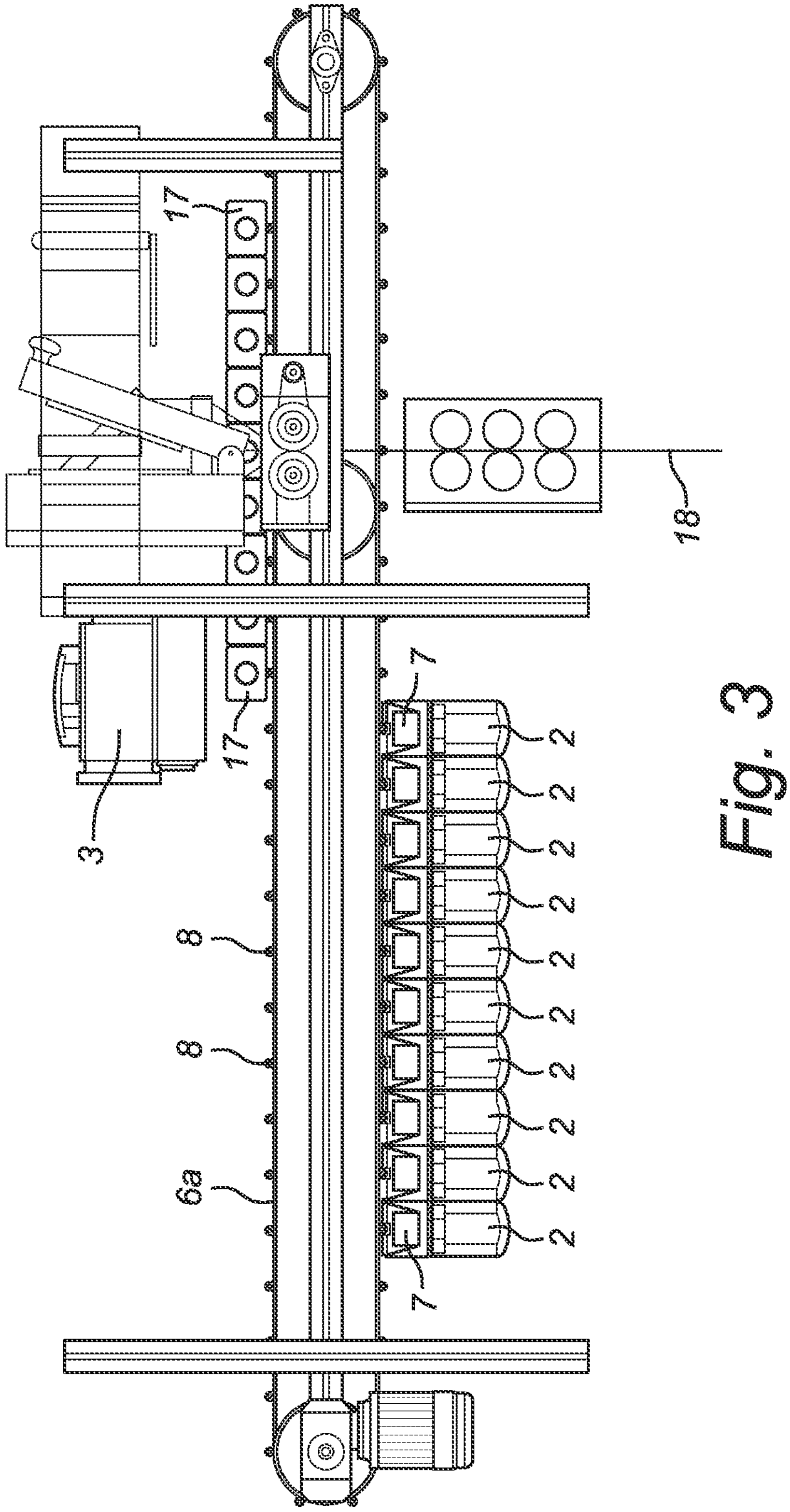
FIG. 3 is a bottom view of the system according to FIG. 1.
Figure 4:
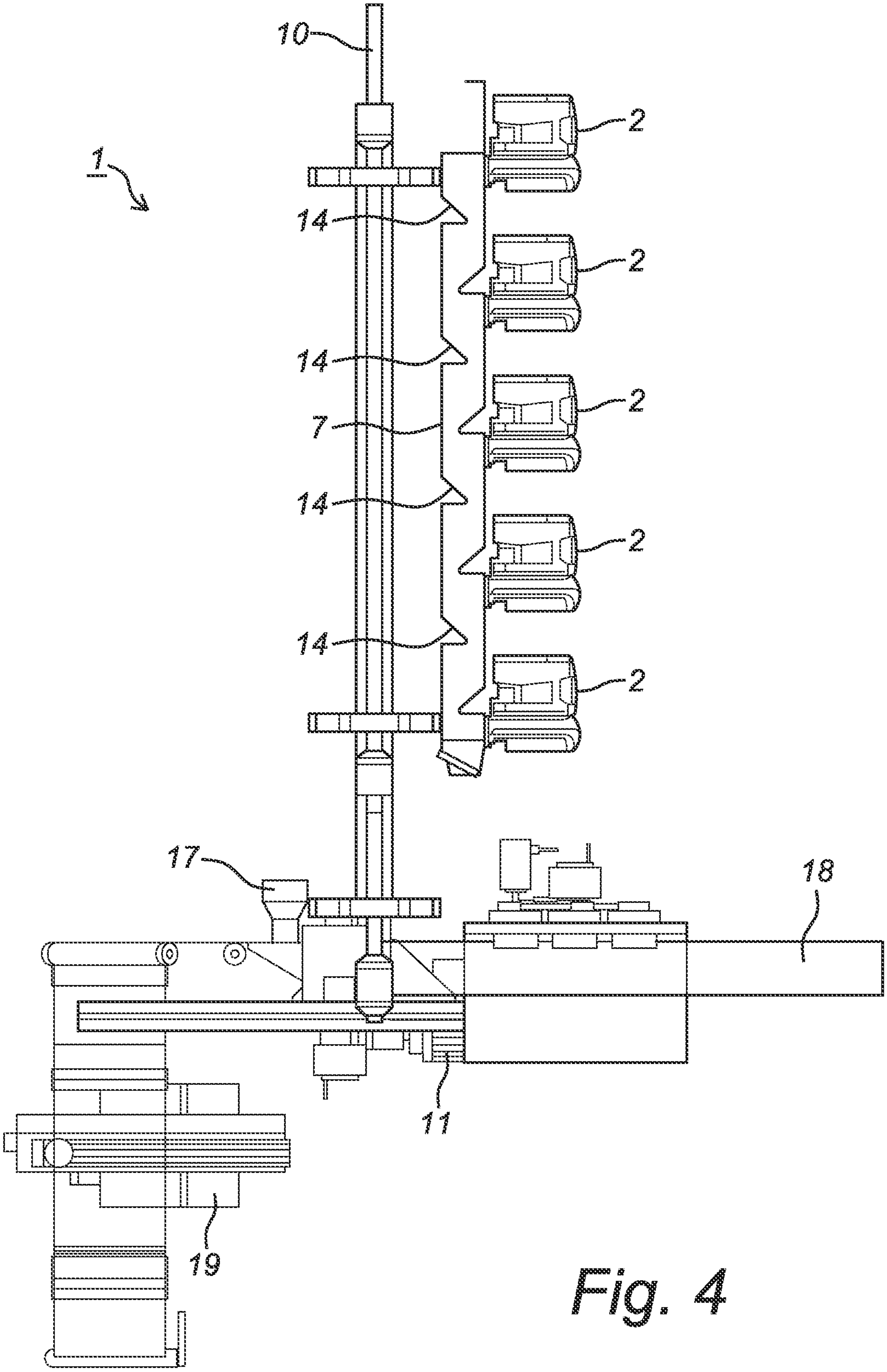
FIG. 4 is a side view of the system according to FIG. 1.

FIGS. 1 and 2 show different perspective views, FIG. 3 shows a bottom view and FIG. 4 shows a side view of a system 1 using the invention for dosing quantities of solid medicines from a plurality of dosing stations 2 to a packaging station 3. System 1 comprises for this purpose a support structure 4 (frame) to which a plurality of dosing stations 2 are connected in stationary, releasable manner.

Each dosing station 2 is adapted here to hold a supply of a type of medicine. Different dosing stations 2 will generally hold a supply of different types of medicine, although it is also possible to envisage frequently-dosed medicines being held by a plurality of dosing stations 2. The majority of the number of applied dosing stations 2 are arranged in two matrix structures 5 (of which only a single matrix structure is shown in the figure), which matrix structures 5 together enclose a part of two first horizontally running conveyor belts 6_a_, 6_b_ for fall tubes 7. Fall tubes 7 are mounted releasably here on mounting elements 8 forming part of both first conveyor belts 6*a*, 6*b*. In the shown exemplary embodiment only a few fall tubes 7 are shown, although in practice each mounting element 8 will generally be connected to a fall tube 7, whereby the first conveyor belts 6*a*, 6*b* are provided all the way round with fall tubes 7. The first conveyor belts 6*a*, 6*b* are driven by drive wheels 9 which are coupled by means of a vertical shaft 10 to an electric motor 11. In order to be able to counter slippage of conveyor belts 6*a*, 6*b* the running surfaces 12 of the drive wheels take a profiled form. Through driving of the first conveyor belts 6*a*, 6*b* the fall tubes 7 can be guided along the dosing stations 2 arranged in matrix structures 5 for the purpose of receiving dosed quantities of medicines dispensed by dosing stations 2. Each fall tube 7 is adapted here for simultaneous co-action with a plurality of dosing stations 2 positioned above each other. Each fall tube 7 is provided for this purpose with a number of passage openings 13 corresponding to the number of dosing stations 2 with which fall tube 7 will simultaneously co-act. Fall tube 7 is also provided with several break walls 14 for limiting the maximum length of the free fall of falling medicines, in order to limit the falling speed, and thereby limit damage to the falling medicines (see FIG. 11). Use is generally made here of a maximum free-fall length of 20 cm. System 1 also comprises a second conveyor belt 15 provided with mounting elements 16 on which a plurality of collecting containers 17, also referred to as medicine carriages, are releasably mounted. Each mounting element 16 will generally be provided here with a collecting container 17 adapted for temporary storage of a dosed quantity of medicines made up in accordance with a prescription. Not all collecting container 17 are shown in the figures. The second conveyor belt 15 is coupled mechanically to first conveyor belts 6*a*, 6*b* and is also driven by electric motor 11, wherein the direction of displacement and displacement speed of conveyor belts 6*a*, 6*b*, 15 are the same. It is moreover advantageous for the first conveyor belts 6*a*, 6*b* and the second conveyor belt 15 to be mutually aligned, wherein mounting elements 8, 16 lie in a substantially vertical line (directly under each other). The distance between adjacent mounting elements 8, 16 amounts to 80 mm, this substantially corresponding to the width of collecting containers 17, fall tubes 7 and dosing stations 2. Collecting containers 17 are adapted to receive medicines falling through fall tubes 7. Each fall tube 7 is provided for this purpose on an underside with a passage opening for falling medicines. For a part of the transport route each collecting container 17 will be positioned here directly under a fall tube 7. In order to be able to prevent as far as possible sagging of conveyor belts 6*a*, 6*b*, 15 due to the weight of respectively fall tubes 7 and collecting containers 17, conveyor belts 6*a*, 6*b* are tensioned under a bias of about 600 N. Conveyor belts 6*a*, 6*b*, 15 are generally manufactured from a relatively strong plastic such as nylon. As shown in the figures, the second conveyor belt 15 is longer than each of the first conveyor belts 6*a*, 6*b*. The advantage hereof is that collecting containers 17 can be transported further along and/or under one or more special dosing stations (not shown), preferably formed by preferential drawers, provided with special—less frequently administered—medicines, which special dosing stations 2 are adapted for direct delivery of selected medicines to collecting containers 17, so not via fall tubes 7. Collecting containers 17 will then be guided in the direction of the dispensing and packaging station 3 where the medicines collected in accordance with prescription are removed from collecting containers 17, wherein the medicines are transferred to an opened foil packaging 18. In packaging station 3 the foil packaging 18 will be successively sealed and provided with specific (user) information. The overall control of system 1 is realized by applying a control unit 19.

Figure 5:
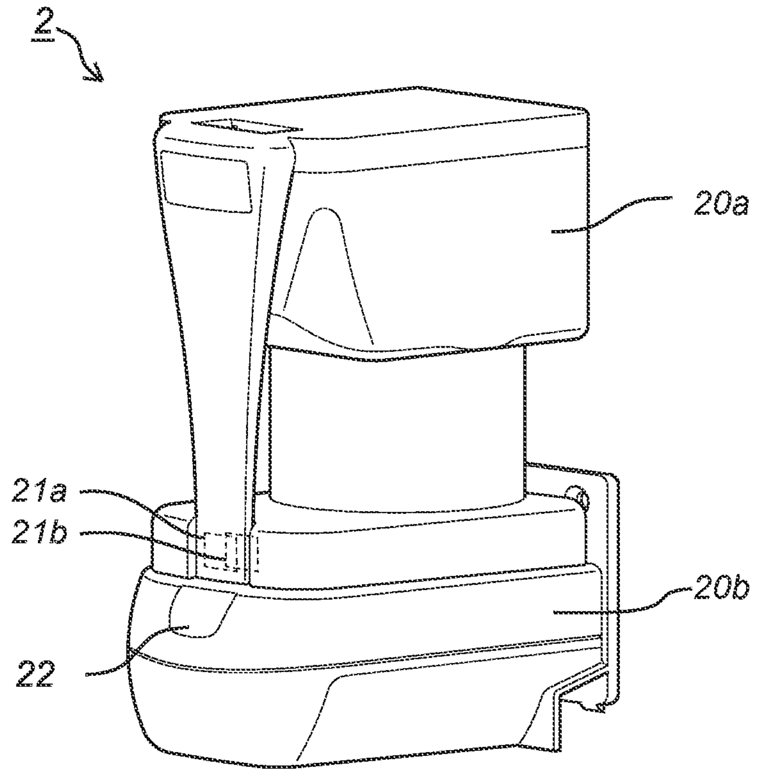
FIG. 5 is a perspective rear view of a dosing station according to the invention for use in a system as shown in FIGS. 1-4.

FIG. 5 is a perspective rear view of a dosing station 2 according to the invention for use in a system 1 as shown in FIGS. 1-4. Dosing station 2 is formed as a unit which can be coupled realisably to support structure 4 and which comprises a container housing 20 and a cover closing the housing of detachable part 20*a*. The housing is preferably manufactured at least partially from a transparent material so that the degree of filling of dosing station 2 can be determined without opening dosing station 2.

According to the invention, the container housing 20*a* is detachable from stationary part 20*b*. The detachable part 20*a* is detached from stationary part 20*b* for refilling or cleaning of the detachable part 20*a*. There are releasable connecting means, such as clips, which hold the detachable part 20*a* on the stationary part 20*b* when the detachable part 20*a* is mounted on the stationary part 20*b*.

The detachable part 20*a* has a memory and communication assembly 21*a* attached to the handle of the detachable part 20*a*. In this particular embodiment, the communication assembly 21*a* is an NFC device. NFC devices are short-range communication tags having integrated circuitry containing information which can be read out by an NFC reader during a communication according to the NFC standard. The distance between NFC tag and reader during the communication must be short, about 10 cm at a maximum. NFC technology is well known in the art and there are various NFC tag/reader combinations and systems available.

On the stationary part 20*b*, a counterpart to the NFC tag 20*a* is attached. The NFC reading device 21*b* is in close proximity to the NFC tag 21*a* if the detachable part 20*a* is mounted to the stationary part 20*b*. In this particular embodiment, the distance between the tag 21*a* and reader 21*b* is less than 2 cm once the detachable part 20*a* is inserted to the stationary part 20*b*.

Once the detachable part 20*a* and the stationary part 20*b* are connected, the dispensing controller instructs the reader 21*b* to read the information from the memory 21*a*. Depending on the information read from the memory, the control of the stationary part 20*b* is adjusted as explained below.

For refilling, the detachable part 20*a* is put in a docking station that allows for writing information to the memory 21*a*. To this end the docking station (not shown) is equipped with a writer to wirelessly store information in the NFC tag 21*a*. The docking station is further equipped with a scanner for scanning information attached to a refill package from which the tablets or capsules are filled into the detachable part 20*a*. After scanning the information, e.g. using a barcode scanner, information from a database is read by the docking station dependent on the read information. The information is stored in the memory 21*a*, overwriting existing information stored therein. The information may particularly contain information on make, type and unique ID of the filled medicine. Further, the information may contain information on supplier, date of first usage, and information on the geometry and appearance of the medicine. In this regard, the size of the medicine entities and some specification of the surface or optical characteristics may be stored. Particularly, the glossiness and colour of the surface of the medicine may be stored.

Figure 6:
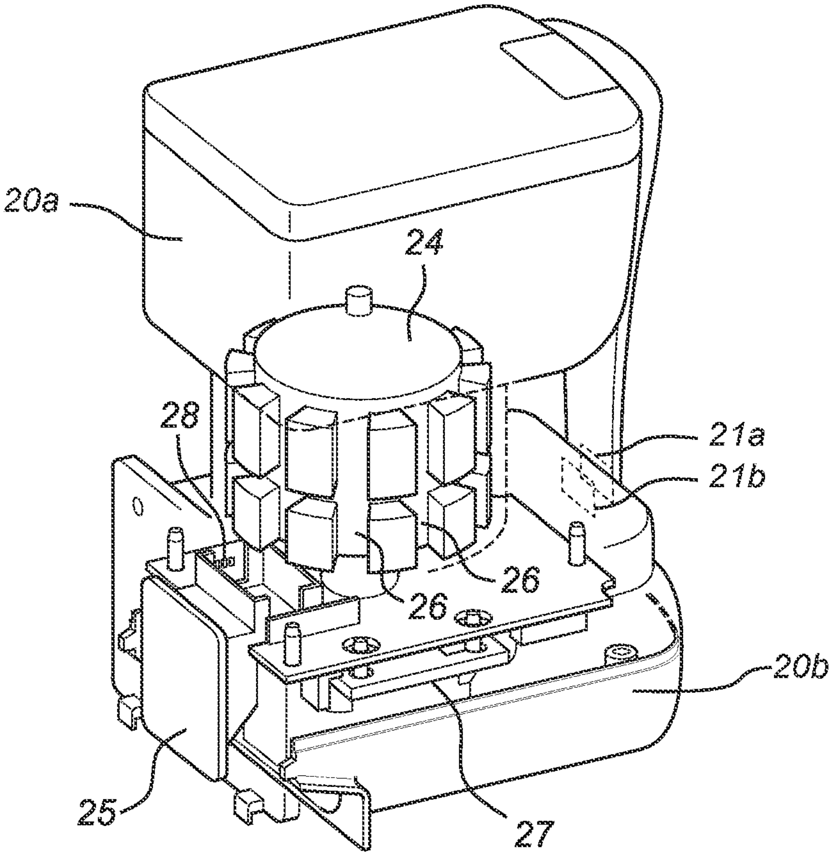
FIG. 6 is a perspective front view of the dosing station according to the invention as shown in FIG. 5.

In the perspective front view of dosing station 2 as shown in FIG. 6 the housing is shown partially transparently in order to make visible the inner mechanism of stationary part 20*b*. Accommodated partly as shown in container housing

20*a* is an axially rotatable individualizing wheel 24 which is adapted during axial rotation to separate a single tablet or single pill which can subsequently be removed from housing 20*a* via a fall guide arranged in the stationary part 20*b* and can be transferred to a passage opening 13 of a fall tube 7 connecting onto fall guide 25. Individualizing wheel 24 is provided here with a plurality of receiving spaces 26 for pills or tablets distributed over the edge periphery. The size of receiving spaces 26 can generally be adapted to the size of the pills or tablets to be held in supply. Individualizing wheel 24 can be rotated axially by means of an electric motor 27 also accommodated in housing 20*a*. Arranged in fall guide 25 is a sensor 28 which can detect the moment at which a pill or tablet for separation falls, and thereby also whether housing 20*a* has been emptied. Dosing stations 2 are visible from an outer side of system 1 and accessible for possible replenishment of dosing stations 2. Housing 20*a* or stationary part 20*b* will generally be provided with multiple LEDs 22 to enable indication of the current status of dosing station 2, and particularly in the case that dosing station 2 has to be replenished or is functioning incorrectly.

The control (not shown) of the stationary part 20*b* controls the motor 27 and receives signals from the sensor 28. Further, the information read from the memory 21*a* via the reader 21*b* is stored in the control. The stationary part 20*b* is controlled in a manner which takes the information in the memory 21*a* into account. In this particular embodiment, the optical sensor 28 is adjusted in order to detect the tablets or capsules passing the sensor 28. This is done by using the information on the surface or colour of the medicine stored in the memory 21*b*. For example, if according to the stored information the tablets have a dark coating, the sensor may be adjusted to detect such dark tablets. If the tablets, according to the stored information, have a shiny or glossy surface, the detection is adapted to compensate for reflection or to suppress false recognition due to multiple reflections.

Additionally, the sensor may be configured to compensate for background light or ambient light. In the dispenser, depending on the surroundings, the time of day, the fill level of the attached container etc., the basic level of light may vary. However, discharge of a tablet or capsule should always be safely detected. To this end a compensation of the signals produced by the sensor is provided. One possibility is to calculate a moving average of the sensor signal and detect only short signals peaks above or below this moving average. The moving average may be calculated by averaging the signals over some second to some minutes. A weighted moving average may even be used.

The compensation is advantageous if a system is to be used in different environments. Further, if a dosing station can be connected to a system as explained above at different positions in an array of dosing station, the automatic compensation adapts the dosing station to every place and condition.

Moreover, the turning speed, stepping speed or turning angle of motor 27 may also be adapted depending on the information stored. The motor may turn faster for small tablets and more slowly for larger tablets. In any case, the control of the dispensing process takes into account the information read from the memory 21*a* on the container.

According to this embodiment, by way of example a discharge of a tablet occurs when the separating wheel is turned by 10 degrees, as stored in the information memory. After a tablet has been discharged the control controls the motor on basis of this information to turn the wheel by a fraction of the required angle for the next discharge, e.g. by 7 degrees. The next time a discharge is commanded, this discharge will require a turn of only 3 degrees because the wheel has already been pre-positioned. This way of control helps to speed up the discharge process an keep it safe because no undesired discharge will take place due to false information about the stored medicine.

This approach according to the invention has the advantage that it is possible to combine containers with dispensing stations without the need for calibrating the dispensing station if the dispensing station was previously used with other types of medicine. This makes the process of refilling or cleaning a container and the subsequent recombination with a stationary part safer and more convenient.

Further, after connection of a detachable part 20*a* to a stationary part 20*b*, the control of the stationary part 20*b* immediately reads the information stored in the memory of the container and it may be instantly verified that the stationary part 20*b* is compatible with the medicine stored in the detachable part 20*a*. For instance, it may be that the separating wheel 24 is not suitable for the filled medicine because the spaces 26 are too small. This may be immediately indicated via the mentioned signal LEDs. Additionally, it may be checked on connection of container and stationary part if the stationary part is approved for this type of medicine. For instance, it may be that certain types of medicine which bear the risk of contamination may only be dispensed with certain dispensers. The check whether the stationary part is approved for the medicine is done on connection and therefore before any medicine passes the dispenser. The dispenser will not dispense any of the filled medicine if the controller recognizes the filled medicine as a non-approved type of medicine.

Figure 7:
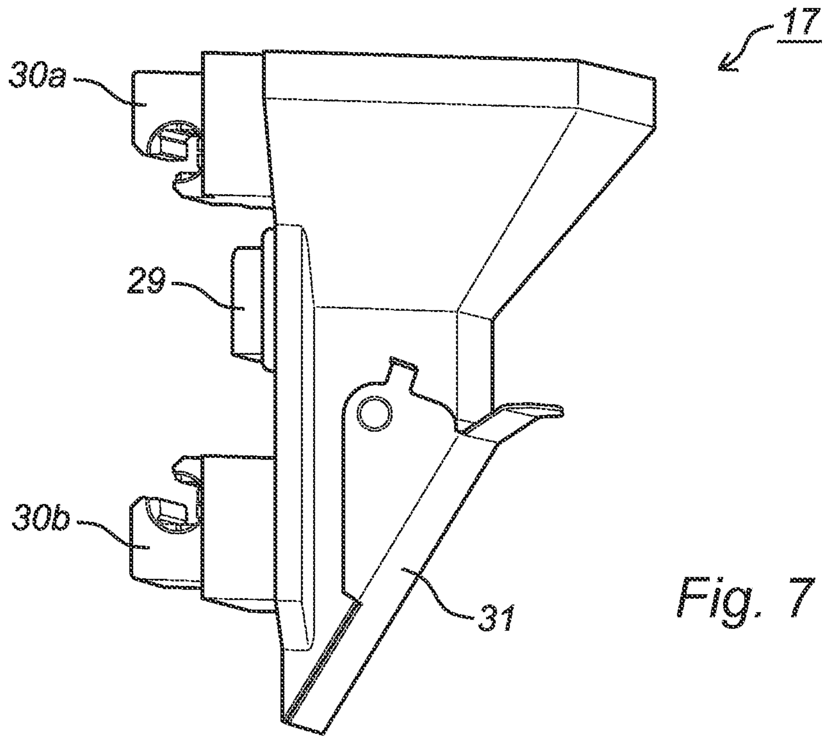
FIG. 7 is a perspective view of a collecting container for use in a system 1 as shown in FIGS. 1-4.
Figure 8:
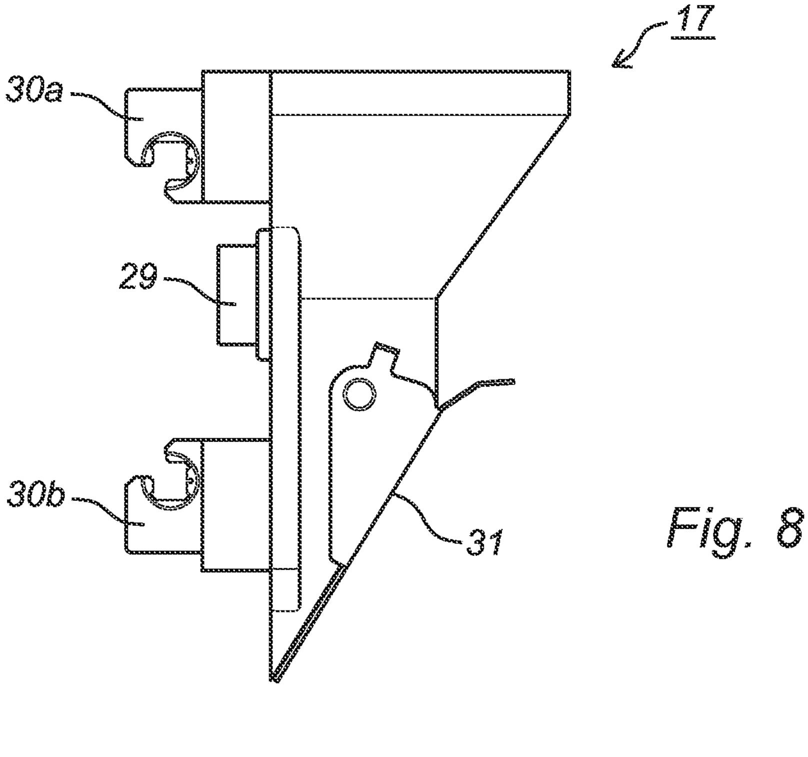
FIG. 8 is a side view of the collecting container according to FIG. 8.

FIG. 7 is a perspective view and FIG. 8 is a side view of a collecting container 17 for use in system 1 as shown in FIGS. 1-4. Collecting container 17 comprises here a mating mounting element 29 for co-action with mounting element 16 of the second conveyor belt 15. In order to increase the stability of collecting container 17, the collecting container 17 also comprises two securing gutters 30*a*, 30*b* for clamping or at least engaging round the second conveyor belt 15. An upper side of collecting container 17 takes an opened form and has a funnel-like shape so that it can receive medicines falling out of a fall tube 7. An underside of collecting container 17 is provided with a pivotable closing element 31 provided with an operating tongue via which the closing element 31 can be pivoted to enable opening, and thereby unloading, of collecting container 17. Collecting container 17 will generally be provided with a biasing element (not shown), such as a compression spring, in order to urge closing element 31 in the direction of the position closing the collecting container 17, whereby erroneous opening of collecting container 17 can be prevented.

Figure 9:
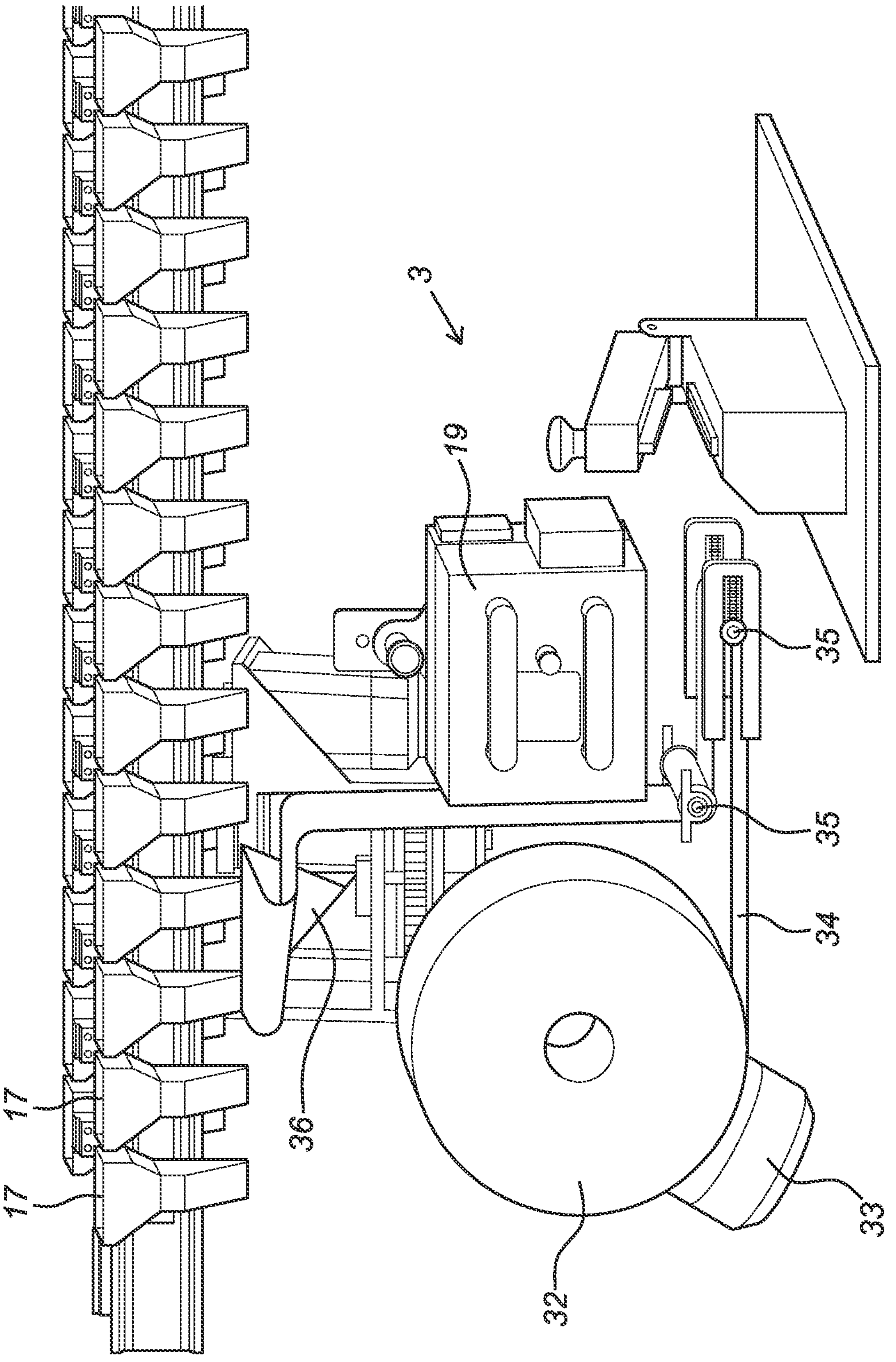
FIG. 9 is a perspective front view of the dispensing and packaging station as applied in a system as shown in FIGS. 1-4.
Figure 10:
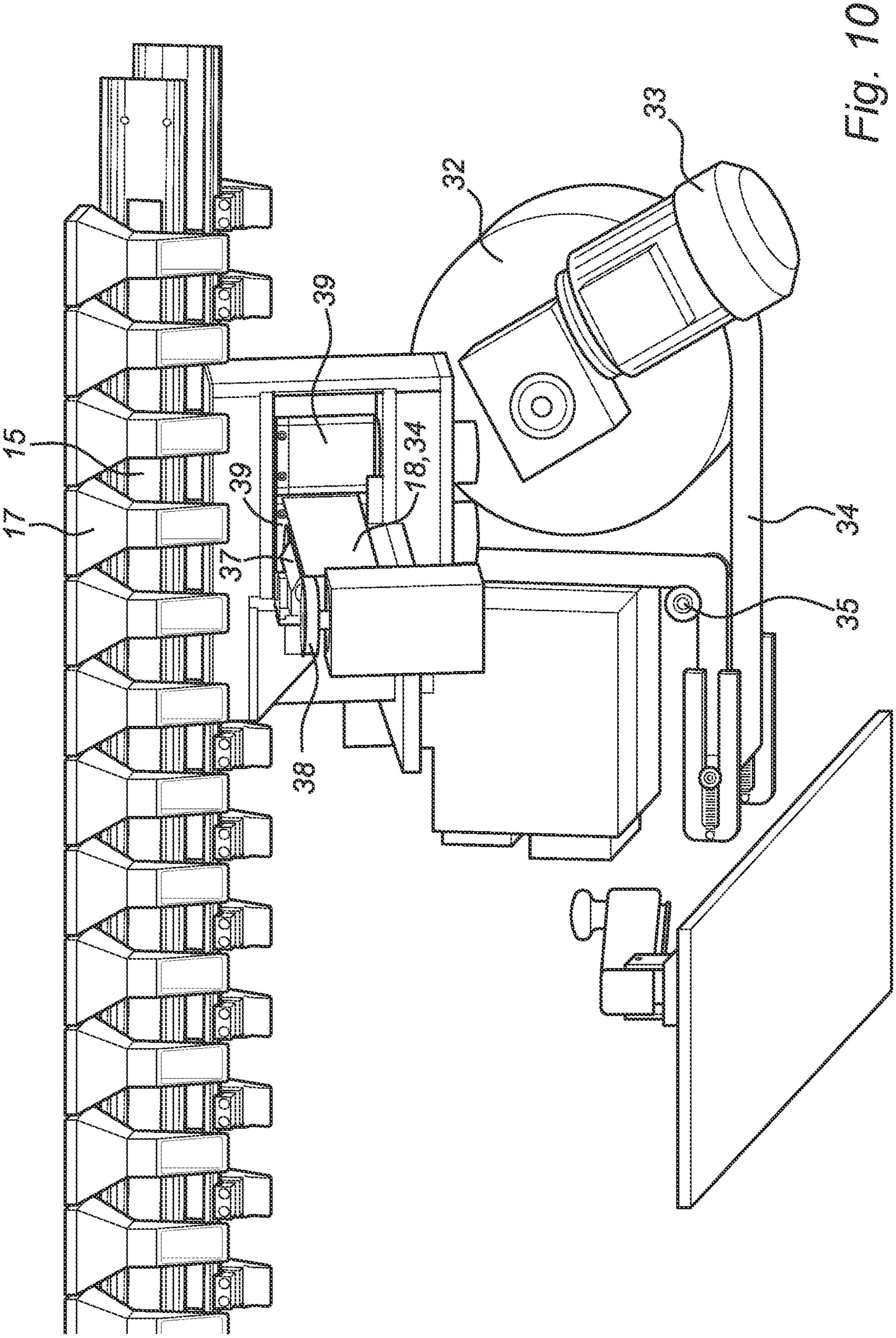
FIG. 10 is a perspective rear view of the dispensing and packaging station according to FIG. 9.

FIGS. 9 and 10 respectively show a perspective front view and perspective rear view of the dispensing and packaging station 3 as applied in system 1 as shown in FIGS. 1-4. Packaging station 3 comprises a foil roll 32 which can be unwound by means of an electric motor 33, after which the unwound foil 34 is guided via a plurality of guide rollers in the direction of the collecting containers 17 to be emptied. The transport direction of foil 34 is indicated by means of arrows in both FIGS. 9 and 10. Before foil 34 is transported below a collecting container 17 for emptying, foil 34 is provided with a longitudinal fold, whereby a V-shaped fold 36 is created in which the medicines can be received following opening of collecting container 17. Foil 34 can be provided with two transverse seals and a longitudinal seal to enable complete sealing of packaging 18. Applied in making the longitudinal seal are two heat bars 37, of which only one heat bar 37 is shown and which press on either side of the two foil parts to be attached to each other, whereby the foil parts fuse together and the longitudinal seal is formed. It is advantageous here for each heat bar 37 to engage foil 34 via a stationary strip manufactured from plastic, in particular Teflon, or displaceable band 38 in order to prevent adhesion of heat bars 37 to the foil. The transverse seals are also created by two upright rotatable heat bars 39 which co-act with each other and press the foil parts against each other in realizing a transverse seal. Packaging 18 can optionally be further provided with a label. Successive packages 18 remain mutually connected in the first instance and together form a packaging strip.

Figure 11:
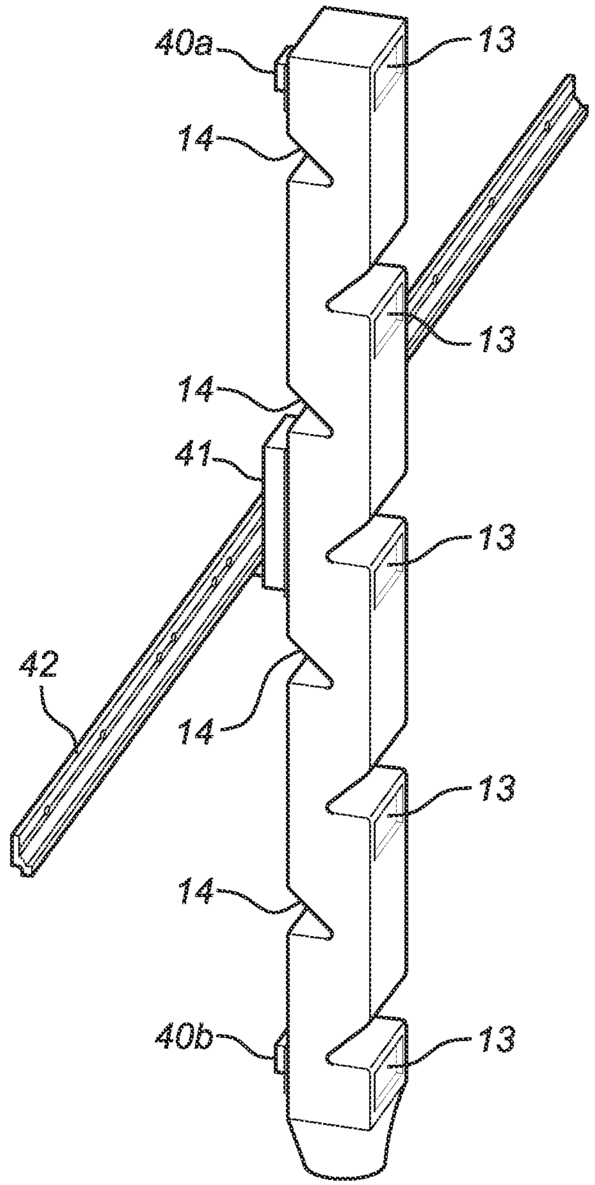
FIG. 11 shows a fall tube as applied in a system according to FIGS. 1-4.

FIG. 11 shows a fall tube 7 provided with two mating mounting elements 40*a*, for co-action with mounting elements 8 of the two first conveyor belts 6*a*, 6*b* as applied in a system 1 according to any of the FIGS. 1-4. A particular feature however of the fall tube 7 shown in FIG. 11 is that fall tube 7 is provided with an additional central guide element 41 for co-action with a stationary guide 42 which can be attached to support structure 4 of system 1, whereby additional stability is imparted to fall tube 7 and both first conveyor belts 6*a*, 6*b*.

Figure 12:
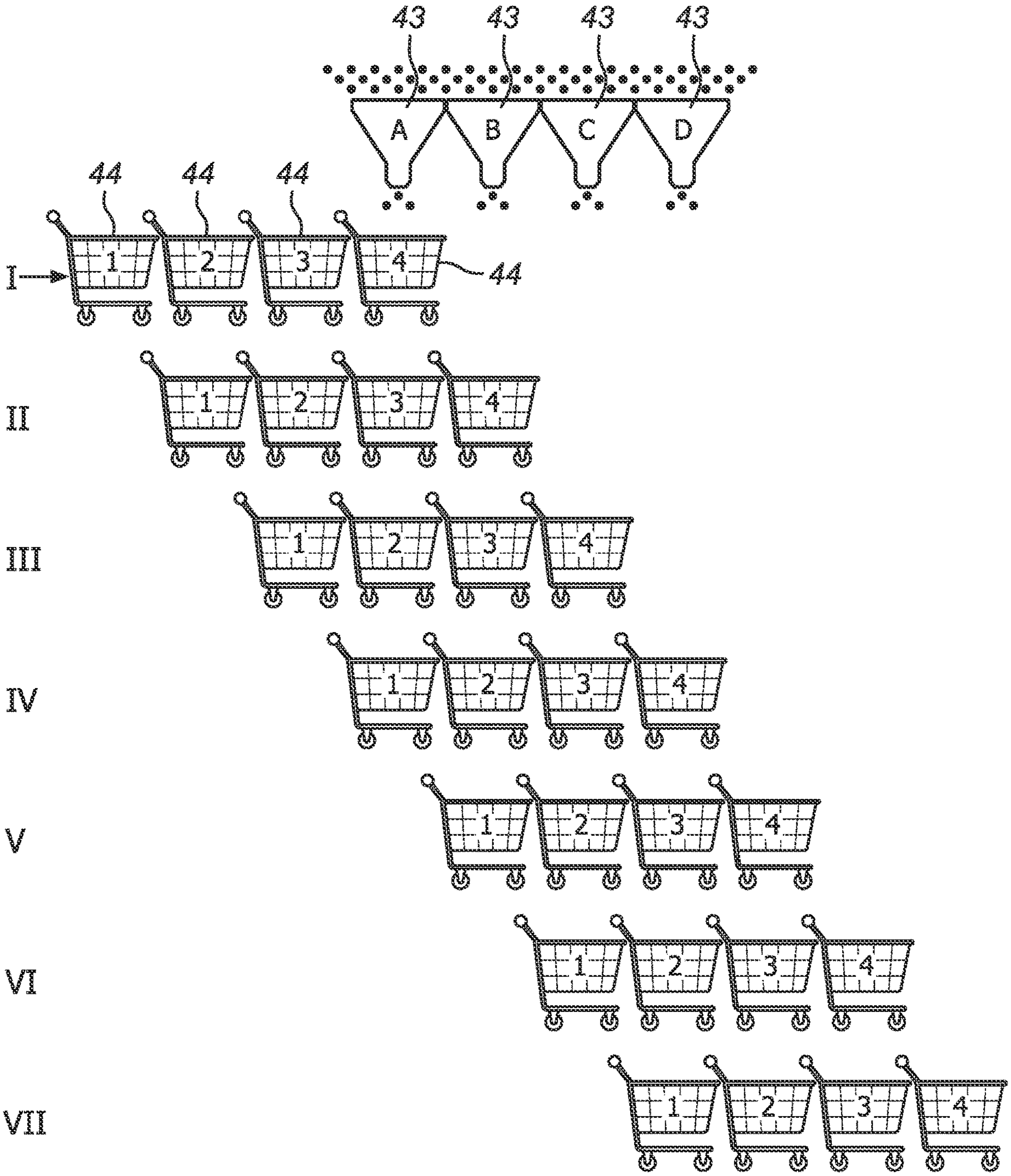
FIG. 12 is a schematic example of the control of four dosing stations on the basis of four prescriptions received for four patients.

FIG. 12 shows a schematic and simplified example of the control of four dosing stations 43 (A, B, C, D) on the basis of four prescriptions received for four patients (1, 2, 3, 4). Applied for the sake of clarity in this simplified example are only four collecting containers 44, wherein each collecting container 44 is assigned to a specific patient and is thus used to collect a prescription for this patient. For the sake of convenience the fall tubes which in fact couple dosing stations 43 to collecting containers 44 are omitted. Collecting containers 44 are coupled to a conveyor belt and in this way pass the different dosing stations 43. In this example the patients require the following quantities of medicine (A, B, C, D) (see table).

| Patient Medicine | A | B | C | D |
|---|---|---|---|---|
| 1 | 0 | 1 | 1 | 2 |
| 2 | 2 | 2 | 0 | 1 |
| 3 | 0 | 1 | 0 | 1 |
| 4 | 1 | 2 | 3 | 4 |

It follows from the table that patient 1 for instance requires no tablets of medicine A, one tablet of medicine B, one tablet of medicine C and two tablets of medicine D. FIG. 12 shows seven different positions I-VII of the train of collecting containers 44. In position I the collecting container 44 of patient 4 is positioned under dosing station 43 filled with medicine A, whereby dosing station 43 will allow one tablet A to drop into collecting container 44 of patient 4. In position II collecting container 44 of patient 4 is positioned under dosing station 43 filled with medicine B, and collecting container 44 of patient 3 is positioned under the dosing station filled with medicine A. In this position II two tablets B will be deposited into collecting container 44 of patient 4; since patient 3 does not require a tablet A, the associated dosing station 43 will remain inactive. The following conversion can in this way be made to position-dependent dosages (see table).

| | A | B | C | D |
|---|---|---|---|---|
| I | 1 | 0 | 0 | 0 |
| II | 0 | 2 | 0 | 0 |
| III | 2 | 1 | 3 | 0 |
| IV | 0 | 2 | 0 | 4 |
| V | 0 | 1 | 0 | 1 |
| VI | 0 | 0 | 1 | 1 |
| VII | 0 | 0 | 0 | 2 |

The prescriptions of the different patients can be found here in a diagonal line (from top left to bottom right). Dosing stations 43 are activated on the basis of the above-stated analysis. Dosing station 43 can be activated at the correct moment on the basis of determining a reference position of a first collecting container 44, the transport speed of collecting containers 44 and the length of the transport path.

It will be apparent that the invention is not limited to the exemplary embodiments shown and described here, but that numerous variants which will be self-evident to the skilled person in this field are possible within the scope of the appended claims.

What is claimed is:

1. A method for dispensing solid drug portions, the method comprising:
- filling a predetermined number of solid drug portions into a storage container of a dispenser;
- writing data into an information memory of the dispenser, the data comprising characteristics of the solid drug portions filled into the storage container;
- reading the information memory; and
- adjusting, by a controller, a sensor based on optical characteristics of the solid drug portions contained in the storage container.

2. The method of claim 1, wherein the sensor is an optical sensor and the information memory stores data comprising optical characteristics of the solid drug portions contained in the storage container, the method further comprising:
- adjusting, by the controller, the optical sensor based on the optical characteristics.

3. The method of claim 1, further comprising:
- adjusting, by the controller, the sensor based on background light conditions.

4. The method of claim 1, further comprising:
- adjusting, by the controller, the sensor based on ambient light conditions.

5. The method of claim 1, further comprising:
- calculating, by the controller, a moving average of signals from the sensor.

6. The method of claim 5, further comprising:
- determining, by the controller, a detection signal based on a signal peak above or below the moving average.

7. The method of claim 1, further comprising:
- determining, by the controller, movement of a drive coupled to the dispenser based on data stored in the information memory.

8. The method of claim 1, wherein the dispenser contains an identifier and the storage container comprises a reader, the method further comprising:
- reading and storing, by the reader of the storage container, the identifier of the dispenser; and
- reading, by an information reading device, the identifier of the dispenser from the reader of the storage container.

9. The method of claim 1, further comprising:

verifying, by the controller, that the storage and dosing station is compatible with the solid drug portions stored in the storage container.

10. The method of claim 1, further comprising:

calculating the number of solid drug portions filled into the storage container on the basis of measured weight differences of the storage container before and after filling the predetermined number of solid drug portions into the storage container.

11. The method of claim 1, further comprising:

monitoring, by a sensor, dispensing of solid drug portions through an outlet of the dispenser; and adjusting the sensor based on background light conditions.

12. The method of claim 1, wherein the dispenser comprises an individualizing mechanism that contains an identifier, the method further comprising:

reading and storing, by a reader of the storage container, the identifier in the information memory.

13. The method of claim 1, wherein the dispenser comprises an electric motor, the method further comprising:

measuring a current through the electric motor; and reversing the electric motor when the measured current exceeds a predefined value.

14. The method of claim 1, further comprising:

indicating, by a light emitting diode, a status of the dispenser.

15. The method of claim 1, wherein the dispenser comprises an individualizing mechanism, the method further comprising:

controlling, by the controller, operation of the dispenser based on rotational speed of the individualizing mechanism.

16. The method of claim 1, wherein the dispenser comprises an individualizing mechanism, the method further comprising:

controlling, by the controller, operation of the dispenser based on acceleration and deceleration of the individualizing mechanism.

17. The method of claim 1, wherein the dispenser comprises an individualizing mechanism, the method further comprising:

controlling, by the controller, operation of the dispenser based on maximum torque of the individualizing mechanism.

18. The method of claim 1, wherein the dispenser comprises an individualizing mechanism, the method further comprising:

controlling, by the controller, operation of the dispenser based on rotation angles of the individualizing mechanism.

19. The method of claim 1, wherein the dispenser comprises an individualizing mechanism, the method further comprising:

controlling, by the controller, operation of the dispenser based on rotation positions of the individualizing mechanism.

20. The method of claim 1, further comprising:

controlling, by the controller, operation of the dispenser based on one of a glossiness of a surface of the solid drug portions and a reflectivity of the surface of the solid drug portions.

* * * * *